US012154576B2

(12) United States Patent
Sharifi et al.

(10) Patent No.: US 12,154,576 B2
(45) Date of Patent: Nov. 26, 2024

(54) USER AUTHENTICATION, FOR ASSISTANT ACTION, USING DATA FROM OTHER DEVICE(S) IN A SHARED ENVIRONMENT

(71) Applicant: GOOGLE LLC, Mountain View, CA (US)

(72) Inventors: Matthew Sharifi, Kilchberg (CH); Victor Carbune, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 100 days.

(21) Appl. No.: 17/573,431

(22) Filed: Jan. 11, 2022

(65) Prior Publication Data

US 2023/0223031 A1 Jul. 13, 2023

(51) Int. Cl.
*G10L 17/24* (2013.01)
*G06F 21/31* (2013.01)
(Continued)

(52) U.S. Cl.
CPC ............ *G10L 17/24* (2013.01); *G06F 21/316* (2013.01); *G06F 21/34* (2013.01); *G06F 21/35* (2013.01);
(Continued)

(58) Field of Classification Search
CPC ......... G10L 17/24; G10L 17/02; G10L 17/06; G10L 17/16; G06F 21/316; G06F 21/34;
(Continued)

(56) References Cited

U.S. PATENT DOCUMENTS 10,127,926 B2 * 11/2018 James ..................... G10L 15/22
11,296,885 B2 * 4/2022 Everson ................ H04L 9/3228
(Continued)

FOREIGN PATENT DOCUMENTS

CN 116670638 A * 8/2023 ....... G06F 16/90332
EP 3863318 A1 * 8/2021 ........... G06F 21/604
WO WO-2020039247 A1 * 2/2020 ........... G10L 15/005

OTHER PUBLICATIONS

European Patent Office; International Search Report and Written Opinion issued in Application No. PCT/US2022/037329; 13 pages; dated Oct. 10, 2022.

Primary Examiner — Edwin S Leland, III
(74) Attorney, Agent, or Firm — Gray Ice Higdon

(57) ABSTRACT

Implementations set forth herein relate to an automated assistant that can solicit other devices for data that can assist with user authentication. User authentication can be streamlined for certain requests by removing a requirement that all authentication be performed at a single device and/or by a single application. For instance, the automated assistant can rely on data from other devices, which can indicate a degree to which a user is predicted to be present at a location of an assistant-enabled device. The automated assistant can process this data to make a determination regarding whether the user should be authenticated in response to an assistant input and/or pre-emptively before the user provides an assistant input. In some implementations, the automated assistant can perform one or more factors of authentication and utilize the data to verify the user in lieu of performing one or more other factors of authentication.

20 Claims, 7 Drawing Sheets

(51) Int. Cl.
  *G06F 21/34* (2013.01)
  *G06F 21/35* (2013.01)
  *G06F 21/40* (2013.01)
  *G10L 17/02* (2013.01)
  *G10L 17/06* (2013.01)
  *G10L 17/16* (2013.01)
  *H04L 9/32* (2006.01)
  *H04L 9/40* (2022.01)
  *H04W 12/062* (2021.01)

(52) U.S. Cl.
  CPC .............. *G06F 21/40* (2013.01); *G10L 17/02* (2013.01); *G10L 17/06* (2013.01); *G10L 17/16* (2013.01); *H04L 9/3231* (2013.01); *H04L 9/3234* (2013.01); *H04L 63/0853* (2013.01); *H04L 63/0861* (2013.01); *H04L 63/102* (2013.01); *H04W 12/062* (2021.01)

(58) Field of Classification Search
  CPC ....... G06F 21/35; G06F 21/40; H04L 9/3231; H04L 9/3234; H04L 63/0853; H04L 63/0861; H04L 63/102; H04W 12/062
  USPC ........................................................ 704/246
  See application file for complete search history.

(56) References Cited

U.S. PATENT DOCUMENTS

| | | | |
|---|---|---|---|
| 11,393,476 B2* | 7/2022 | Moreno | G10L 15/26 |
| 2018/0232511 A1* | 8/2018 | Bakish | G06F 21/32 |
| 2019/0068599 A1* | 2/2019 | Jakubzak | H04L 63/0861 |
| 2019/0332753 A1* | 10/2019 | Lewis | G06F 21/32 |
| 2020/0057845 A1* | 2/2020 | Beck | G06F 21/316 |
| 2020/0065722 A1* | 2/2020 | Smith | H04W 4/023 |
| 2020/0110864 A1* | 4/2020 | Casado | G10L 17/04 |
| 2020/0357395 A1* | 11/2020 | Mirelmann | G06F 3/167 |
| 2020/0366671 A1* | 11/2020 | Larson | G06F 9/451 |
| 2021/0074295 A1* | 3/2021 | Moreno | G10L 15/005 |
| 2021/0409947 A1* | 12/2021 | Navarro | H04W 8/005 |
| 2022/0316904 A1* | 10/2022 | Goenawan | G01C 21/3667 |
| 2023/0223031 A1* | 7/2023 | Sharifi | G06F 21/316 704/246 |

* cited by examiner

USER AUTHENTICATION, FOR ASSISTANT ACTION, USING DATA FROM OTHER DEVICE(S) IN A SHARED ENVIRONMENT

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input.

Some automated assistants can, for at least some requests, require user authentication via one or more modalities and/or via one or more factors of authentication (e.g., voice, face, fingerprint, secure passcode, etc.).

As one example, an automated assistant can require multi-factor authentication for a request to control (e.g., lock and/or unlock) a smart door lock. For instance, if the user provides a spoken utterance requesting unlocking of the smart door lock, the automated assistant can, before unlocking the smart door lock, require both voice authentication based on the spoken utterance (e.g., text-dependent or text-independent authentication) and can also require passcode authentication. The passcode authentication can be performed via prompting for a passcode, and processing responsive input to verify a passcode in the responsive input conforms to a secure passcode for the user. Although such multi-factor authentication can improve security of the smart door lock, it can prolong the duration of the interaction between the automated assistant and the user and/or require significant processing to be performed by the automated assistant. For instance, prompting for the passcode and processing responsive input can require significant processing and can prolong the duration of the interaction and, as a result, prolong the unlocking of the smart door lock. Also, for instance, voice authentication on the spoken utterance can be unsuccessful in many situations due to there being too much background noise, the spoken utterance not being long enough and/or phonetically diverse enough, and/or the spoken utterance lacking text-dependent term(s) (in situations where text-dependent authentication is used). In such situations, the automated assistant can prompt for the spoken utterance to be repeated by the user to perform voice authentication on the repeated spoken utterance or, alternatively, can prompt for yet another factor of authentication. This can likewise require significant processing and can prolong the duration of the interaction.

As another example, an automated assistant can require voice authentication only before performing action(s) of certain spoken utterances. However, voice authentication based on a spoken utterance can be unsuccessful in many situations due to there being too much background noise, the spoken utterance not being long enough and/or phonetically diverse enough, and/or the spoken utterance lacking text-dependent term(s) (in situations where text-dependent authentication is used). In such situations, the automated assistant can prompt for the spoken utterance to be repeated by the user to perform voice authentication on the repeated spoken utterance or, alternatively, can prompt for yet another factor of authentication. This can likewise require significant processing and can prolong the duration of the interaction.

SUMMARY

Implementations set forth herein relate to an automated assistant that can solicit other device(s) to assist with streamlining one or more user authentication processes. The one or more authentication process(e)s can include a single factor authentication, two-factor authentication, and/or any other multi-factor authentication. When the automated assistant receives, from a user, a request that may require user authentication before fulfillment, the automated assistant can solicit one or more devices for supplemental data. Supplemental data from a respective device can indicate a degree to which the respective device predicts the user to be present, or not present, in an environment in which the automated assistant was invoked via the request. The automated assistant can utilize this data to determine whether to authenticate the user and fulfill the request submitted by the user. In these and other manners, processing required by the automated assistant in authenticating the user can be reduced and/or the duration of the interaction between the user and the automated assistant can be lessened. For example, a prompt for additional authentication and resulting processing of responsive input can be obviated and/or a prompt for the user to repeat a spoken utterance (e.g., when initial voice authentication on an initial spoken utterance is unsuccessful) can be obviated.

In some implementations, the solicitation of data by the automated assistant can be pre-emptively performed to prepare for a predicted, forthcoming interaction between a user and an automated assistant, which may require authentication. In these and other manners, the duration of the interaction between the user and the automated assistant can be lessened as the solicitation of data is pre-emptively performed, mitigating latency of provision of the data in response to the solicitation.

In some implementations, the data provided by other devices can be: utilized exclusively for authenticating a user, utilized in addition to an authentication process of the automated assistant, and/or utilized in combination with a particular assistant authentication process. For example, the automated assistant can utilize device data from one or more other devices to authenticate a user, without using an input to the automated assistant to authenticate the user. Alternatively, or additionally, the device data can be utilized to authenticate the user according to a first authentication process (e.g., authentication of presence), and the automated assistant can authenticate with the user according to a second authentication process (e.g., voice verification). Alternatively, or additionally, the device data from one or more different devices can be utilized in combination with an assistant authentication process to enhance an accuracy of the assistant authentication.

As one example of some implementations disclosed herein, a user can invoke an automated assistant by providing a spoken utterance such as, "Assistant, show me the security camera footage from last night." This spoken utterance can embody a request for the automated assistant to render a video captured by an outdoor security camera during the previous night. However, because the request involves accessing security footage, the automated assistant can require two-factor authentication of the user before fulfilling the request. For example, the two-factors of authentication can be a first factor, such as a voice signature, and a second factor, which can be selected from a variety of different factors and/or verified using one or more sources of data. In some implementations, the automated assistant can verify the second factor by soliciting one or more devices located in an environment in which the automated assistant is being accessed.

For example, in response to determining that the request from the user involves a two-factor authentication, the automated assistant can solicit a smart doorbell for data that can indicate whether a particular user is the user who provided the request. In some implementations, the automated assistant can solicit data from a smart doorbell, which can be equipped with a security camera that faces away from a front entrance of a home of the user. The smart doorbell can be a computing device that is provided by a third party, relative to an entity that provides the automated assistant. The computing device of the smart doorbell can process images captured by the security camera to verify when a user that is associated with a smart doorbell account is entering the home and/or leaving the home. When the automated assistant solicits the smart doorbell for data regarding a prediction about whether one or more users are home or not, the smart doorbell may not respond with any biometric data (depending on a preference of the one or more users) such as image(s) that capture facial feature(s) of the user. Instead, the smart doorbell can respond with data that indicates a value(s) that characterizes a degree to which a particular user is predicted to be home or not. In such an example, the data with which the smart doorbell responds can be based on biometric data (e.g., based on processing image(s)), but itself lacks any biometric data. The automated assistant can use this data, and/or any other data provided by one or more other devices, to determine whether to verify a factor of authentication for fulfilling the request.

Continuing with the example, the value indicated by the data from the smart doorbell can indicate a confidence with which the smart doorbell is predicting that a particular user is home. For example, the smart doorbell can generate the value as a function of how recently the smart doorbell determined the user entered and/or left the home. For instance, the smart doorbell can generate a value of 1.0 (reflecting highest confidence and/or that a most recent event involved the user entering the home) if the smart doorbell determined the user entered the home within the last one minute and has not since been determined to have left the home. Also, for instance, the smart doorbell can decrease the value by 0.05 (or other amount) every two minutes (or other time period) thereafter until a threshold (e.g., 0.0) is reached. Also, for instance, the smart doorbell can generate a value of 0.0 (reflecting lowest confidence and/or that a most recent event involved the user leaving the home) if the smart doorbell determined the user left the home within the last minute and has not since been determined to have entered the home—and can increase the value by 0.05 (or other amount) every two minutes (or other time period) thereafter until a threshold (e.g., 0.3) is reached. Regardless of the technique(s) utilized to generate the value, in some implementations the automated assistant can use this value in combination with a weight value for establishing a prediction regarding whether the particular user is the user who provided the spoken utterance. The weight value can be generated over time using one or more heuristic processes and/or one or more trained machine learning models to reflect a confidence that the automated assistant has in the data from the smart doorbell. In other words, the automated assistant can weigh data from certain devices more heavily than other data from other devices according to whether a particular device has historically accurately predicted whether a particular user is home and/or whether the particular device has most recently (relative to other devices) detected the user. In some implementations, the weight value can be different for different devices, different users that are the subject of the prediction, different requests that are subject to authentication, and/or any other feature that can be associated with a weight value.

When the automated assistant receives solicited data from one or more devices, the automated assistant can utilize the solicited data to make a determination regarding whether a particular user is present and/or provided the request. In some implementations, the automated assistant can utilize the solicited data to determine that, out of all the persons that are typically in a house (e.g., two spouses), a particular user is more likely to be present, and, optionally, other users are less likely to be present. Based on this determination, the particular user can be identified as the user who provided the spoken utterance regarding reviewing the security footage (e.g., footage captured by a security camera device facing toward the backyard of the home). In this way, the automated assistant can authenticate the user from their voice and also from data from one or more other devices. This can reduce latency that may otherwise be introduced when the automated assistant conducts multi-factor authentication at a single device (e.g., voice verification and passcode verification). Furthermore, this can reduce a number of redundant processes (e.g., various user authentication processes) that are performed at different devices within a home environment, thereby allowing the home environment to operate more efficiently.

In some implementations, a process for authenticating a user via a device that is separate from an assistant-enabled device can be utilized when preemptively loading data that may be useful for a request that a user is predicted to subsequently provide. For example, a user that gets up from their living room couch to walk into their kitchen may pass by a smart thermostat along the way. The thermostat can be registered to the user and may include a motion sensor for activating a display interface of the thermostat when the user approaches the thermostat. The user can adjust the thermostat to their preferred setting (e.g., 70 F), thereby putting the thermostat on notice—without utilizing biometric data—that a person is present, and the person is likely the user because of how the person modified a temperature setting of the thermostat. When the user arrives in the kitchen, the user can provide a spoken utterance to a standalone display interface to invoke an automated assistant and delete an alarm for the following morning (e.g., "Assistant, cancel my alarm for tomorrow."). However, prior to the user providing the spoken utterance, the automated assistant can authenticate the user via a camera of the standalone display device, with prior permission from the user, and also solicit other devices for data that can assist with authenticating the user according to another factor (e.g., presence verification).

In some instances, the automated assistant can solicit another device for additional data when the automated assistant is unable to gather adequate data for authenticating the user (e.g., the kitchen is dark and so visual authentication may be inhibited). In such circumstances, the automated assistant may utilize the additional data to enhance an accuracy of any user authentication performed by the automated assistant. In some instances, the automated assistant can communicate with the smart thermostat to obtain data from the smart thermostat regarding whether the smart thermostat predicts that the user is the one who walked into the kitchen. This data can be considered supplemental to any data pre-emptively processed by the automated assistant for authenticating the user.

For example, in response to receiving the request for additional data, the smart thermostat can generate a predicted value that a particular user is present and/or that the particular user provided the input to the automated assistant. Alternatively, or additionally, the smart thermostat can generate multiple values, and each value can correspond to a prediction that a respective user is present or not present, and/or that a respective user provided, or did not provide, the assistant input. In some implementations, the smart thermostat, and/or any other device solicited by the automated assistant, can generate each value based on one or more factors that can contribute to a prediction of presence, and/or with or without the user of biometric data. For example, the smart thermostat can generate a value of 1.0 (e.g., an indication of high confidence in a presence prediction) for a user that modified the smart thermostat within a minute of receiving the solicitation from the automated assistant. Alternatively, or additionally, the smart thermostat can generate lower values as certain durations of time transpire for certain persons. For instance, a value of 1.0 can be provided for a user that adjusted the smart thermostat within a minute of receiving the assistant solicitation, and a value of 0.3 can be provided for another user that adjusted the smart thermostat more than 30 minutes before receiving the assistant solicitation.

In some implementations, values that indicate a confidence in a presence prediction for a particular user can be adjusted when a different user is detected. For example, a user that interacts with a thermostat and then leaves their home, after walking past a doorbell device, can be assigned a low value for a presence prediction. This presence prediction can be further reduced when another user is detected, by the doorbell device, to have entered the home. This reduction in the value of confidence in the presence prediction can mitigate false positives and/or instances of incorrect identification. For instance, after confidence value for a first user satisfies a threshold for fulfilling a user request, the confidence value for the first user can be quickly reduced (e.g., made to reflect a lower confidence) when a second user is detected. This can improve security for automated assistants that may frequently provide access to various users.

In some implementations, a value provided by another device can be used to modify a user authentication process being performed by the automated assistant. For example, the automated assistant can authenticate a user via voice signature by generating an embedding from audio data captured by an assistant enabled device. The embedding can be mapped to a latent space, and a distance between the mapped embedding and pre-existing embeddings corresponding to various users can be measured. The distance and/or other metric generated from this mapping can be adjusted for a particular user based on the device data communicated from one or more other devices in response to the assistant solicitation. For example, when the smart thermostat responds with a value of 1.0 for a particular user, a confidence metric generated based on the embedding mapping can be adjusted by 10% toward (i.e., increase confidence from 8.0 to 8.8 out of 10) that particular user being the user who provided the assistant input. However, when the smart thermostat provides a value of 0.9 for a particular user, the confidence metric generated based on the embedding mapping can be adjusted by −10% away (i.e., decrease confidence from 8.0 to 7.2 out of 10) from the particular user being the user who provided the assistant input.

When the automated assistant considers the user authenticated according to these instances of data, the automated assistant can pre-emptively cache data (e.g., assistant data and/or other application data) in furtherance of fulfilling a request that the user is predicted to provide. Otherwise, the automated assistant may solicit the user and/or one or more other devices for data that can assist with authenticating the user.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
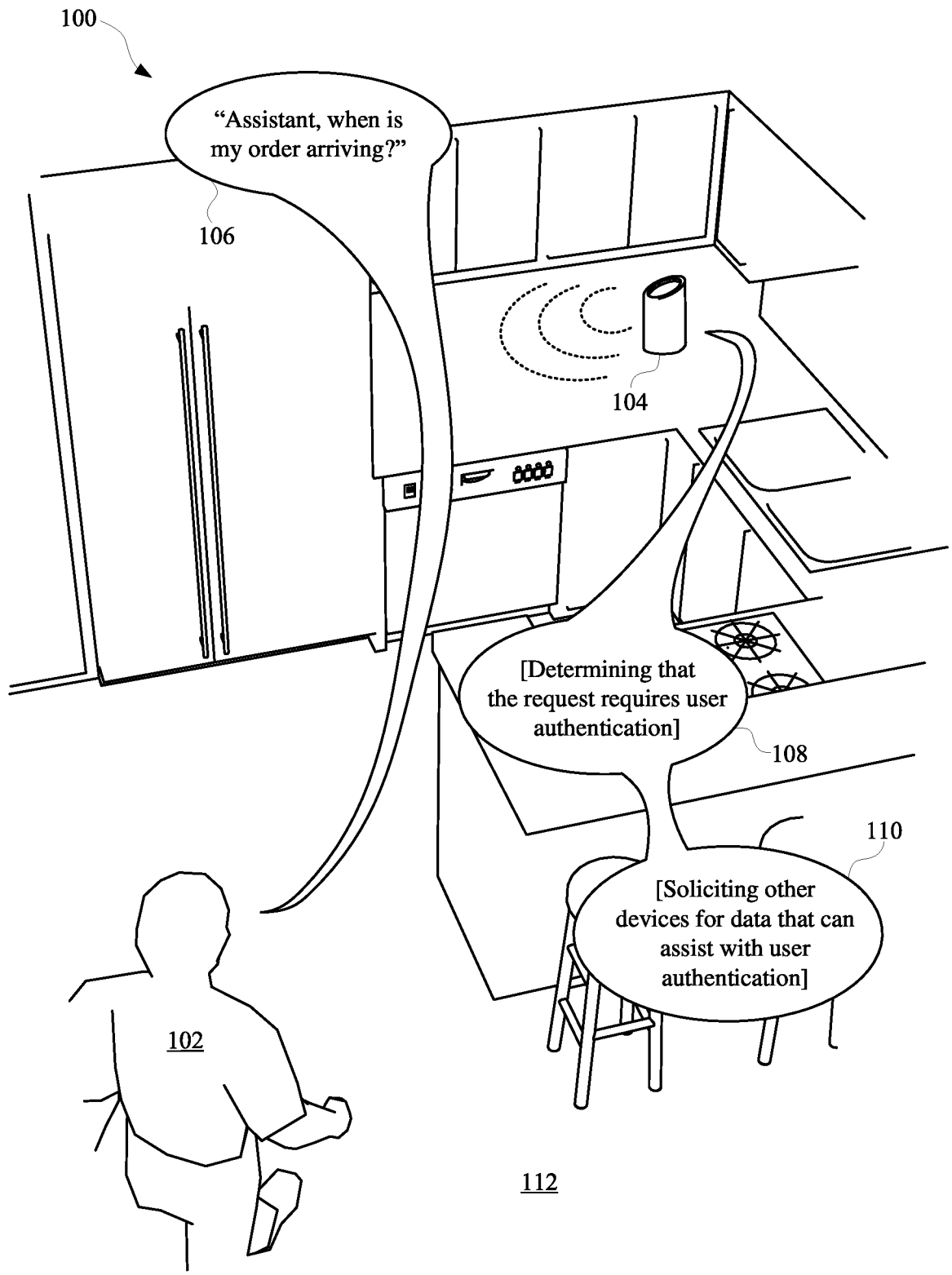
FIG. 1A, FIG. 1B, FIG. 1C, and FIG. 1D illustrate views of a user interacting with an automated assistant that can solicit data from other devices in furtherance of authenticating the user.
Figure 1B:
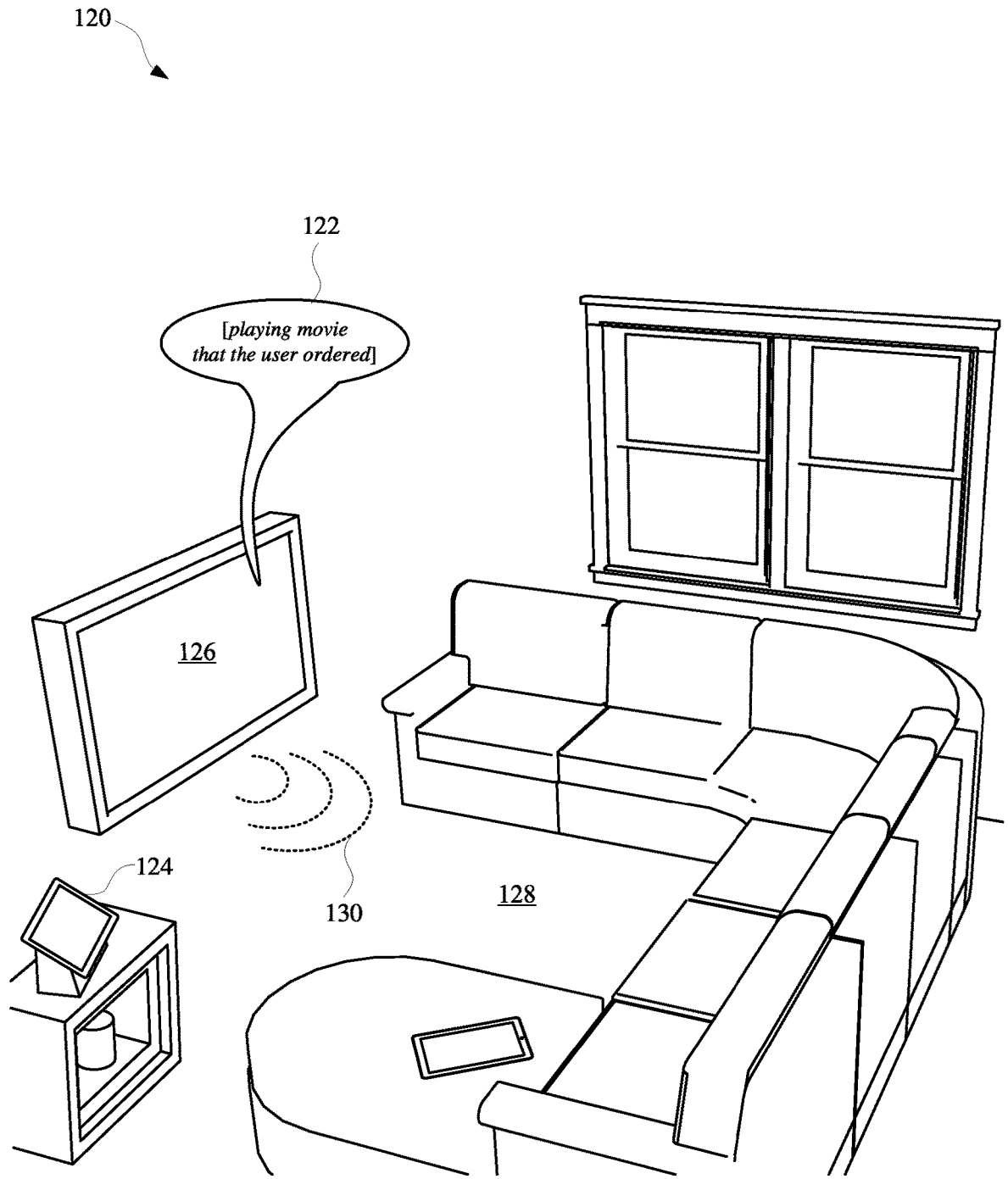
Figure 1C:
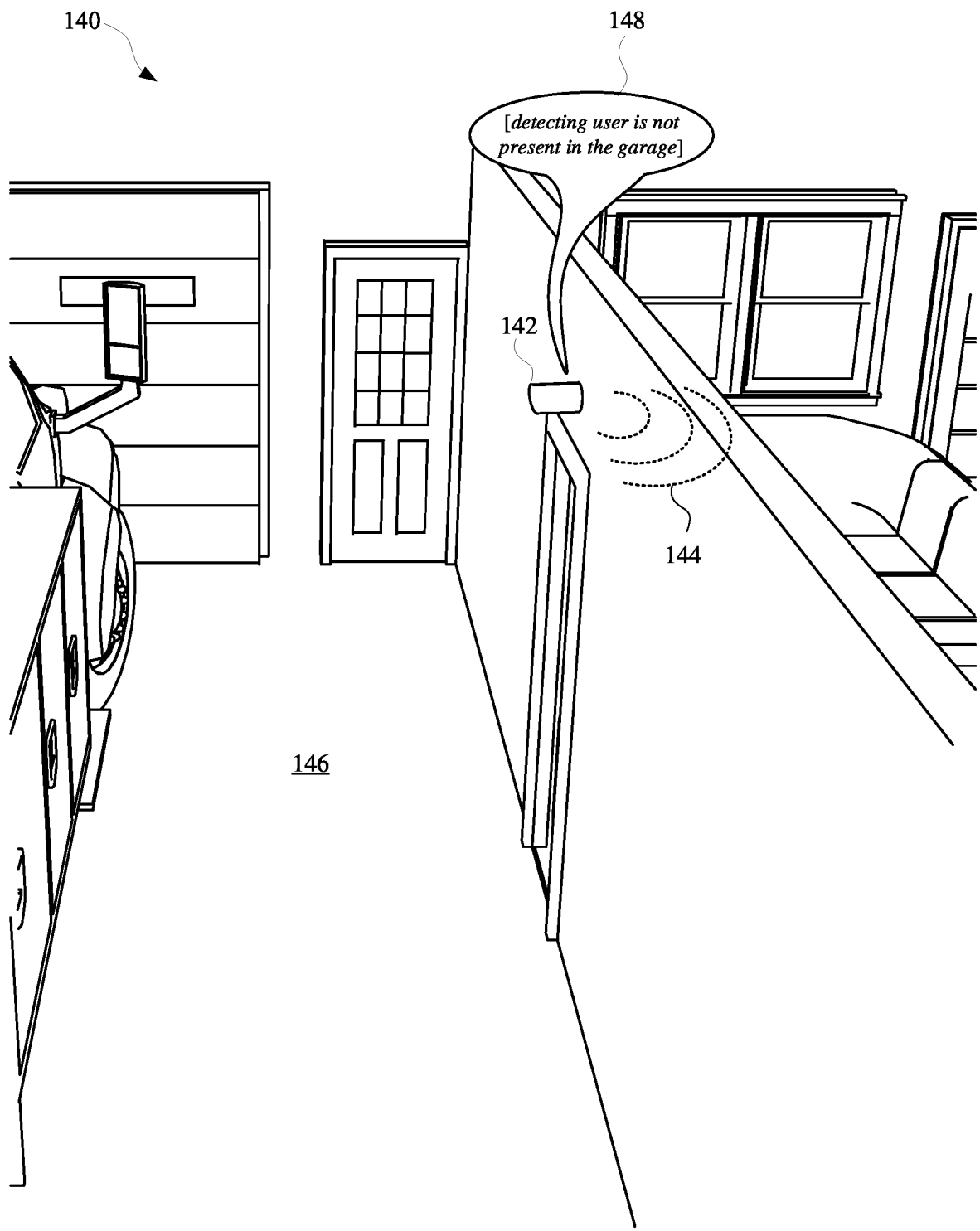
Figure 1D:
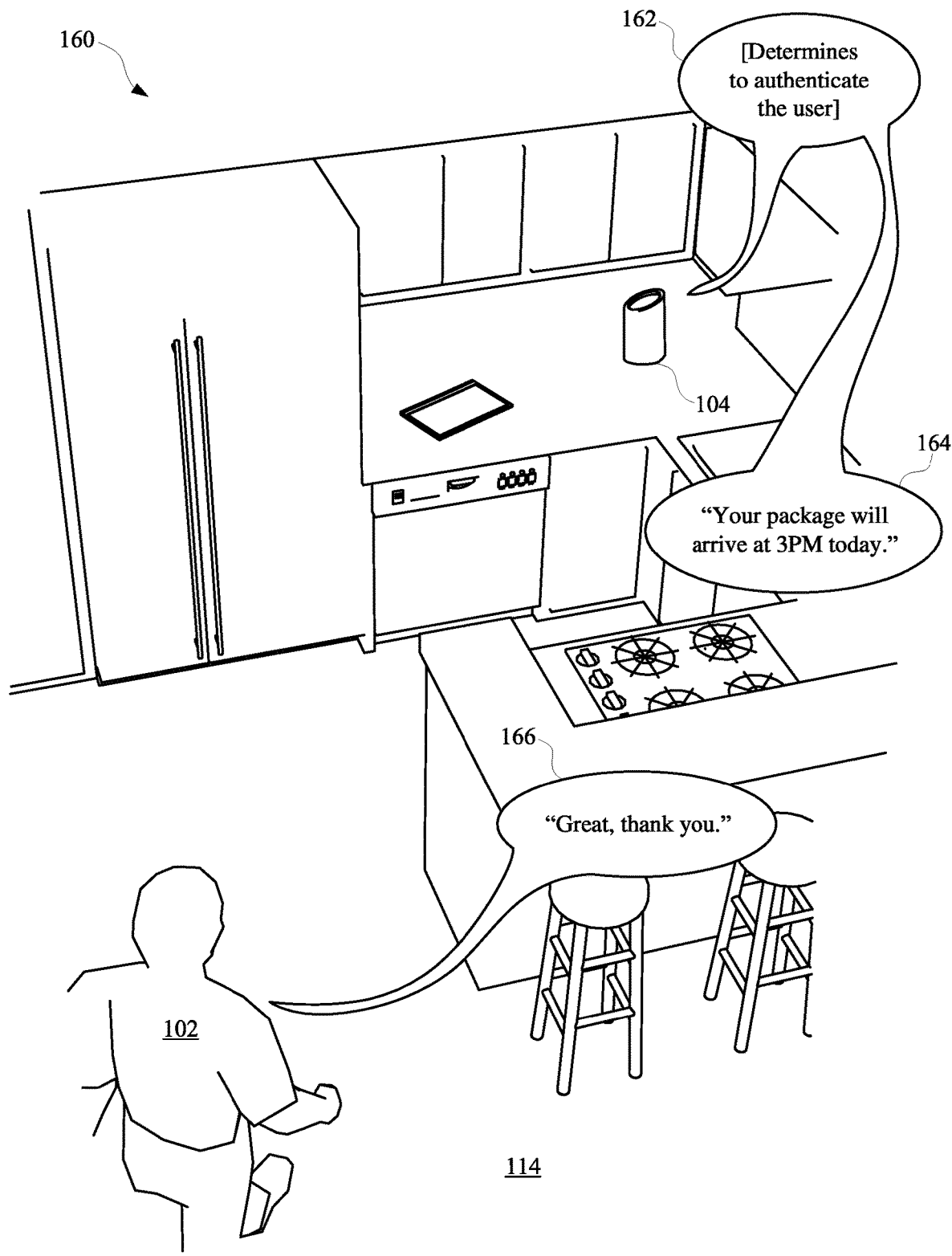

FIG. 1A, FIG. 1B, FIG. 1C, and FIG. 1D illustrate a view 100, a view 120, a view 140, and a view 160 of a user 102 interacting with an automated assistant that can solicit data from other devices in furtherance of authenticating the user 102. In some instances, the other devices can be devices that do not provide direct access to the automated assistant and/or are provided by third parties relative to a provider of the automated assistant. For example, the user 102 can relocate to an area such as a kitchen 112 that is in an environment, such as a home of the user 102, and provide an input to a standalone speaker device 104. The standalone speaker device 104 can provide access to the automated assistant, and can be invoked via spoken utterance. When the user 102 walks into the kitchen 112, the user 102 can provide a spoken utterance 106 such as, "Assistant, when is my order arriving?" In response to receiving the spoken utterance 106, the automated assistant can make a determination 108 regarding whether a request embodied in the spoken utterance 106 requires some amount of user authentication. Based on this determination, the automated assistant can determine to solicit the user 102 to authenticate with the automated assistant and/or perform an operation 110 of soliciting other devices for data that can assist with the user authentication.

When the automated assistant determines to solicit other devices for data, the automated assistant can communicate with other devices that are associated with the user 102, with prior permission from the user 102. The other devices can include, for example, a standalone display device 124 and a smart television 126, as illustrated in view 120 of FIG. 1B, and smart lightbulb 142, as illustrated in view 140 of FIG. 1C. The standalone display device 124 and the smart television 126 can be located in a living room 128 of the home environment, and the smart lightbulb 142 can be located in a garage 146. In some implementations, when the automated assistant solicits the smart television 126 for data that can assist with authenticating the user 102, the smart television 126 can respond with data that indicates a value. The value can correspond to a degree to which the user 102 is predicted to be present in the environment, without the smart television 126 sharing any biometric data. For example, when the smart television 126 receives the solicitation for data, the smart television 126 can be performing an operation 122 of rendering a movie that was purchased by the user 102. In response to receiving the solicitation, the smart television 126 can determine, based on the user 102 having ordered the movie, that the user 102 is present, and generate responsive data 130 that indicates that the user 102 is predicted to be present. This responsive data 130 can then be shared with the automated assistant, which can utilize the responsive data 130 for authenticating the user 102.

In some implementations, a device can provide data that can indicate the user 102 is not present and/or has not interacted with a particular device within a particular period of time, which can indicate that the user 102 is present somewhere else. For example, the smart lightbulb 142 can be located in the garage 146 when the smart lightbulb 142 receives a solicitation for data from the automated assistant. The solicitation can be received when the smart lightbulb 142 is performing an operation 148 of detecting that no one is present in the garage. In response to receiving the solicitation (i.e., a request for data) from the automated assistant, the smart lightbulb 142 can generate responsive data 144 that indicates that the user 102 is not present in the garage 146. Alternatively, or additionally, the smart lightbulb 142 can generate responsive data 144 that indicates when the user 102 was most recently in the garage 146. Alternatively, or additionally, the smart lightbulb 142 can generate responsive data 144 that indicates a degree to which the user 102 is predicted to be located in the garage and/or another area in a home environment. In some implementations, the generated responsive data 144 can be based on one or more sensors (e.g., a motion sensor) of the smart lightbulb 142 and/or data that one or more users have provided to an application associated with the smart lightbulb 142. For example, the user may login to the application at certain times to control the smart lightbulb 142 (e.g. adjust a brightness and/or temperature), and these times can correspond to motion being detected by the smart lightbulb 142. Therefore, the smart lightbulb 142 can provide, in some instances, data that indicates a prediction regarding whether a certain person is present and/or has recently interacted with a device, whether a certain person is not present and/or has not recently interacted with a device, and/or whether any person has been detected. Any such instances of data can be utilized by the automated assistant to assist with user authentication.

The responsive data 144 generated by the smart lightbulb 142 can be provided to the automated assistant, which can utilize data received from one or more other devices to determine whether to authenticate the user 102. In some implementations, certain data can be weighted differently than other data when the automated assistant is considering whether to authenticate the user 102 according to one or more factors of authentication. For instance, data from a particular source that has been historically accurate when predicting whether the user 102 is present or not present can be weighted more (e.g., more likely to be relied upon by the automated assistant) than another source that has been less historically accurate. In some implementations, data from a particular source that has provided more specificity in the provided data than another source can be weighted more (e.g., more likely to be relied upon) than another source that has provided less specificity regarding whether a user is present or not present. For example, instances of data can be more specific when the data identifies one or more durations of time that a user is estimated to have been present or not present, according to a particular device.

In some instances, data from various sources can be assigned different weights by the automated assistant and/or by a respective device that is providing the data. For instance, the smart lightbulb 142 can provide a value X and the smart television 126 can provide a value Y. The value X can be assigned a weight value A by the automated assistant and/or the smart lightbulb 142, and the value Y can be assigned a weight value B by the automated assistant and/or the smart television 126. In some implementations, an overall value for a prediction regarding whether a particular user is the user who provided the assistant input can be based on an equation such as $((X*A)+(Y*B))/2$. This overall value can be utilized by the automated assistant to proceed with fulfilling the request submitting by the user 102, and/or ask the user 102 to further authenticate with the automated assistant.

In some implementations, data from various sources can be utilized, with prior permission from the user 102, to authenticate the user 102 according to an operation 162 that can involve multiple factors of authentication. For example, an action of providing a status of a package can necessitate multi-factor authentication, such as voice authentication and facial recognition. In response to receiving the initial spoken utterance 106 from the user 102, the automated assistant can perform a voice verification process to verify a first factor of authentication. The automated assistant can also utilize the data received from other devices to verify a second factor of authentication, in lieu of the automated assistant directly requesting that the user 102 participate in the second factor of authentication.

For instance, in lieu of the automated assistant requesting that the user 102 relocate to another device that has a built-in camera (e.g., the standalone display device 124), the automated assistant can authenticate the presence of the user 102 using the received data. In some implementations, the data can be processed using one or more heuristic processes and/or one or more trained machine learning models. For example, data from the various devices can be processed to generate an embedding that can be mapped to a latent space. A distance from the generated embedding to one or more other embeddings can indicate whether the user 102 is predicted to be present or not present. For example, data from the smart lightbulb 142 and the smart television 126 can be processed by one or more trained machine learning models to generate an embedding. When the embedding is mapped to a latent space, and a distance between the embedding and another embedding satisfies a threshold, the automated assistant can determine to authenticate the user 102.

When the automated assistant has authenticated the user 102, the automated assistant can initialize performance of one or more operations that correspond to a request embodied in the spoken utterance 106 from the user 102. For example, the automated assistant can identify the "order" that was placed by the user 102 and provide an output such as, "Your package will arrive at 3 PM today." This output can be provided based on the automated assistant having verified a voice signature of the user 102 and a presence of the user 102, based on the received data. In some implementations, feedback 166 from the user 102 (e.g., "Great, thank you.") can be utilized by the automated assistant as feedback for further training the one or more trained machine learning models. For instance, positive feedback from the user 102 can indicate that the automated assistant should adjust weights for sources of data that may have indicated the user 102 is likely not present and/or has likely not recently interacted with a nearby device. Alternatively, or additionally, when the automated assistant elects to expressly request the user 102 to authenticate with the automated assistant, rather than relying on the received data, the automated assistant can adjust weights for sources of data that may have indicated the user 102 is present. In this way, the next time a similar circumstance arises, the automated assistant may be more likely to rely on the data from other devices for user authentication—at least for certain requests.

Figure 2:
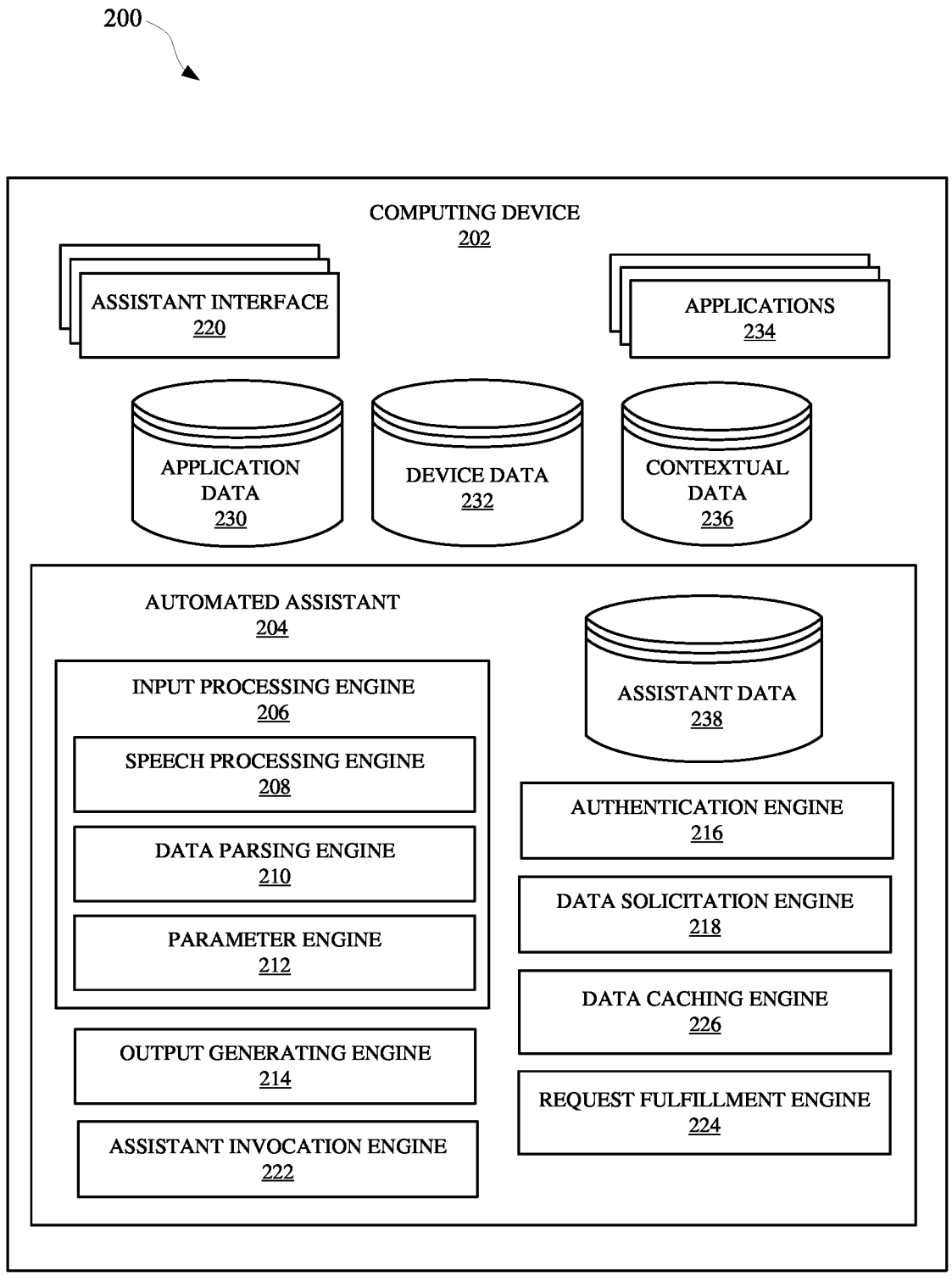
FIG. 2 illustrates a system for operating an automated assistant that can authenticate a user by soliciting data from devices that may have access to data that may be indicative of whether the user is present or not.

FIG. 2 illustrates a system 200 for operating an automated assistant 204 that can authenticate a user by soliciting data from devices that may have access to data that may be indicative of whether the user is present or not. The automated assistant 204 can operate as part of an assistant application that is provided at one or more computing devices, such as a computing device 202 and/or a server device. A user can interact with the automated assistant 204 via assistant interface(s) 220, which can be a microphone, a camera, a touch screen display, a user interface, and/or any other apparatus capable of providing an interface between a user and an application. For instance, a user can initialize the automated assistant 204 by providing a verbal, textual, and/or a graphical input to an assistant interface 220 to cause the automated assistant 204 to initialize one or more actions (e.g., provide data, control a peripheral device, access an agent, generate an input and/or an output, etc.). Alternatively, the automated assistant 204 can be initialized based on processing of contextual data 236 using one or more trained machine learning models. The contextual data 236 can characterize one or more features of an environment in which the automated assistant 204 is accessible, and/or one or more features of a user that is predicted to be intending to interact with the automated assistant 204. The computing device 202 can include a display device, which can be a display panel that includes a touch interface for receiving touch inputs and/or gestures for allowing a user to control applications 234 of the computing device 202 via the touch interface. In some implementations, the computing device 202 can lack a display device, thereby providing an audible user interface output, without providing a graphical user interface output. Furthermore, the computing device 202 can provide a user interface, such as a microphone, for receiving spoken natural language inputs from a user. In some implementations, the computing device 202 can include a touch interface and can be void of a camera, but can optionally include one or more other sensors.

The computing device 202 and/or other third-party client devices can be in communication with a server device over a network, such as the internet. Additionally, the computing device 202 and any other computing devices can be in communication with each other over a local area network (LAN), such as a Wi-Fi network. The computing device 202 can offload computational tasks to the server device in order to conserve computational resources at the computing device 202. For instance, the server device can host the automated assistant 204, and/or computing device 202 can transmit inputs received at one or more assistant interfaces 220 to the server device. However, in some implementations, the automated assistant 204 can be hosted at the computing device 202, and various processes that can be associated with automated assistant operations can be performed at the computing device 202.

In various implementations, all or less than all aspects of the automated assistant 204 can be implemented on the computing device 202. In some of those implementations, aspects of the automated assistant 204 are implemented via the computing device 202 and can interface with a server device, which can implement other aspects of the automated assistant 204. The server device can optionally serve a plurality of users and their associated assistant applications via multiple threads. In implementations where all or less than all aspects of the automated assistant 204 are implemented via computing device 202, the automated assistant 204 can be an application that is separate from an operating system of the computing device 202 (e.g., installed "on top" of the operating system)—or can alternatively be implemented directly by the operating system of the computing device 202 (e.g., considered an application of, but integral with, the operating system).

In some implementations, the automated assistant 204 can include an input processing engine 206, which can employ multiple different modules for processing inputs and/or outputs for the computing device 202 and/or a server device. For instance, the input processing engine 206 can include a speech processing engine 208, which can process audio data received at an assistant interface 220 to identify the text embodied in the audio data. The audio data can be transmitted from, for example, the computing device 202 to the server device in order to preserve computational resources at the computing device 202. Additionally, or alternatively, the audio data can be exclusively processed at the computing device 202.

The process for converting the audio data to text can include a speech recognition algorithm, which can employ neural networks, and/or statistical models for identifying groups of audio data corresponding to words or phrases. The text converted from the audio data can be parsed by a data parsing engine 210 and made available to the automated assistant 204 as textual data that can be used to generate and/or identify command phrase(s), intent(s), action(s), slot value(s), and/or any other content specified by the user. In some implementations, output data provided by the data parsing engine 210 can be provided to a parameter engine 212 to determine whether the user provided an input that corresponds to a particular intent, action, and/or routine capable of being performed by the automated assistant 204 and/or an application or agent that is capable of being accessed via the automated assistant 204. For example, assistant data 238 can be stored at the server device and/or the computing device 202, and can include data that defines one or more actions capable of being performed by the automated assistant 204, as well as parameters necessary to perform the actions. The parameter engine 212 can generate one or more parameters for an intent, action, and/or slot value, and provide the one or more parameters to an output generating engine 214. The output generating engine 214 can use the one or more parameters to communicate with an assistant interface 220 for providing an output to a user, and/or communicate with one or more applications 234 for providing an output to one or more applications 234.

In some implementations, the automated assistant 204 can be an application that can be installed "on-top of" an operating system of the computing device 202 and/or can itself form part of (or the entirety of) the operating system of the computing device 202. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 202. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 202 can include one or more applications 234 which can be provided by a third-party entity that is different from an entity that provided the computing device 202 and/or the automated assistant 204. An application state engine of the automated assistant 204 and/or the computing device 202 can access application data 230 to determine one or more actions capable of being performed by one or more applications 234, as well as a state of each application of the one or more applications 234 and/or a state of a respective device that is associated with the computing device 202. A device state engine of the automated assistant 204 and/or the computing device 202 can access device data 232 to determine one or more actions capable of being performed by the computing device 202 and/or one or more devices that are associated with the computing device 202. Furthermore, the application data 230 and/or any other data (e.g., device data 232) can be accessed by the automated assistant 204 to generate contextual data 236, which can characterize a context in which a particular application 234 and/or device is executing, and/or a context in which a particular user is accessing the computing device 202, accessing an application 234, and/or any other device or module.

While one or more applications 234 are executing at the computing device 202, the device data 232 can characterize a current operating state of each application 234 executing at the computing device 202. Furthermore, the application data 230 can characterize one or more features of an executing application 234, such as content of one or more graphical user interfaces being rendered at the direction of one or more applications 234. Alternatively, or additionally, the application data 230 can characterize an action schema, which can be updated by a respective application and/or by the automated assistant 204, based on a current operating status of the respective application. Alternatively, or additionally, one or more action schemas for one or more applications 234 can remain static, but can be accessed by the application state engine in order to determine a suitable action to initialize via the automated assistant 204.

The computing device 202 can further include an assistant invocation engine 222 that can use one or more trained machine learning models to process application data 230, device data 232, contextual data 236, and/or any other data that is accessible to the computing device 202. The assistant invocation engine 222 can process this data in order to determine whether or not to wait for a user to explicitly speak an invocation phrase to invoke the automated assistant 204, or consider the data to be indicative of an intent by the user to invoke the automated assistant—in lieu of requiring the user to explicitly speak the invocation phrase. For example, the one or more trained machine learning models can be trained using instances of training data that are based on scenarios in which the user is in an environment where multiple devices and/or applications are exhibiting various operating states. The instances of training data can be generated in order to capture training data that characterizes contexts in which the user invokes the automated assistant and other contexts in which the user does not invoke the automated assistant. When the one or more trained machine learning models are trained according to these instances of training data, the assistant invocation engine 222 can cause the automated assistant 204 to detect, or limit detecting, spoken invocation phrases from a user based on features of a context and/or an environment.

In some implementations, the system 200 can include an authentication engine 216 that can determine whether a request from a user will require some amount of user authentication for the request to be fulfilled. For example, when a user provides a spoken utterance and/or other input to the automated assistant 204, the automated assistant 204 can determine whether the input embodies a request that should be subject to user authentication. For instance, the automated assistant 204 can determine whether the request corresponds to one or more certain types of requests (e.g., a request to access personal data, a request to access finance data, a request to communicate with a private contact, etc.). When the request is determined to correspond to one or more certain types of requests, the authentication engine 216 can communicate with a data solicitation engine 218, which can generate a request for one or more other devices to provide data that can assist with authenticating the user.

In some implementations, the data solicitation engine 218 can determine whether to solicit other devices for data and/or not solicit other devices for data based on contextual data associated with the request from the user. For instance, when a request is provided by a user that is already authenticated with the computing device 202, the data solicitation engine 218 can bypass soliciting other devices for data. Alternatively, or additionally, when the data solicitation engine 218 determines that user authentication can be performed exclusively at the computing device 202, with equal or higher accuracy and lower latency than soliciting other devices for assistance, the data solicitation engine 218 can bypass soliciting other devices for data. However, when the data solicitation engine 218 determines to solicit other devices for data, the data solicitation engine 218 can generate a request for the other devices to provide data that can indicate whether a particular user or users were present during a period of time before, during, and/or after the automated assistant 204 received the input.

In response to receiving the request for data from the data solicitation engine 218, one or more other devices can generate responsive data that can include a presence estimation value. In some implementations, the presence estimation value can be an estimate of a probability that the user interacted with, or did not interact with, a particular device and/or application during a period of time before, during, and/or after the input was received by the automated assistant 204. The presence estimation value can be generated using sensor data that is available to the device that is providing the presence estimation value. Furthermore, the presence estimation value can be void of any biometric data, although the device itself may utilize biometric data for certain functions exclusively available via the device. In some implementations, the presence estimation value can be a higher value when a particular device is confident that the user did interact with the particular device, and can be a lower value when the particular device is confident that the user did not interact with the particular device. Alternatively, or additionally, the data solicitation engine 218 can process responsive data received from one or more other devices using one or more weight values. A weight value can be generated by the data solicitation engine 218 and can indicate a confidence that a particular device is providing accurate data. The weight values can be learned over time as the automated assistant 204 attempts to rely on responsive data when authenticating a user.

In some implementations, data from other devices can be utilized by the authentication engine 216 to determine whether to authenticate the user who provided the input. For instance, one or more trained machine learning models can be utilized to process the responsive data for determining whether to authenticate the user. In some implementations, when the automated assistant 204 receives a request that may entail multi-factor authentication, the automated assistant 204 can conduct a first factor of authentication (e.g., voice signature recognition using a speaker verification model), and a second factor of authentication can be verified using device data (e.g., presence estimation value based on device sensor data) from one or more other devices. Therefore, when a first factor of authentication fails at the automated assistant 204, the other device data may not compensate for the lack of verification of the first factor of authentication. As a result, the automated assistant 204 may elect to not fulfill a request until the multiple factors of authentication are verified.

In some implementations, a request fulfillment engine 224 can initialize performance of one or more operations in furtherance of fulfilling a request, after the user is determined to be authenticated. In some implementations, a data caching engine 226 can be utilized to cache certain data pre-emptively (e.g., audio data characterizing an assistant response to a predicted request), when a user is authenticated with the automated assistant 204, but prior to the user providing a request to the automated assistant 204. In this way, latency can be reduced when the user provides a request that may entail user authentication, since the user can be pre-emptively authenticated according to the operations discussed herein.

Figure 3:
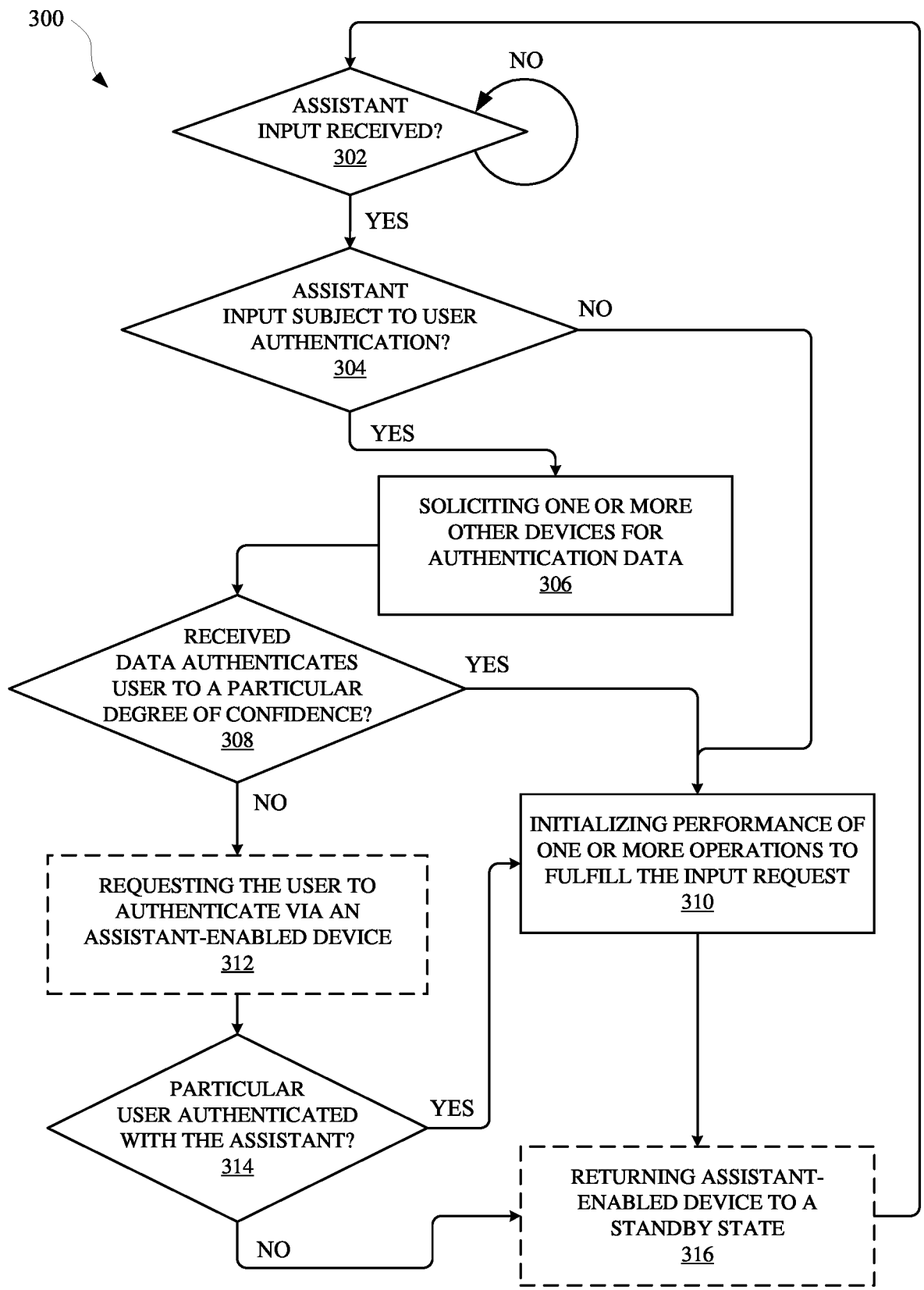
FIG. 3 illustrates a method for authenticating a user based on data from one or more devices, other than a device that the user is utilizing to invoke an automated assistant.

FIG. 3 illustrates a method 300 for authenticating a user based on data from one or more devices, other than a device that the user is utilizing to invoke an automated assistant. The authentication of the user can be based on a degree to which a user is predicted, by the other devices, to be present. The method 300 can be performed by one or more computing devices, applications, and/or any other apparatus or module that can be associated with an automated assistant. The method 300 can include an operation 302 of determining whether an input has been received by an automated assistant, which can be accessible via a computing device located in a home environment associated with one or more users. The input to the automated assistant can be, for example, a spoken utterance that embodies a request for the automated assistant to initialize a video call from the computing device. The spoken utterance can be, for example, "Assistant, video call my office." This request can refer to initializing a video call with a contact labeled "My Office" that is stored in a contact directory of a particular user device. Additionally, this request from the user can be provided when the user is about to leave to go to their office.

The method 300 can proceed from the operation 302 to an operation 304, which can include determining whether the assistant input embodies a request that is subject to user authentication. When the assistant input is subject to an authentication process, the authentication process can include single factor authentication and/or multi-factor authentication. For example, a factor of authentication can include voice recognition, facial recognition, fingerprint recognition, and/or any other form of authentication. When the automated assistant determines that the request is not subject to user authentication, the method 300 can proceed from the operation 304 to an operation 310, which can include initializing performance of one or more operations to fulfill the input request. When the assistant input is subject to user authentication, the method 300 can proceed from the operation 304 to an operation 306.

The operation 306 can include soliciting one or more other devices for authentication data. In some implementations, a determination of whether to solicit other devices for data regarding whether a particular user is present or not can depend on an ability of the automated assistant to readily perform user authentication. For instance, a request can require a single factor of authentication, such as facial recognition. When the user is facing a camera of an assistant-enabled device when the user provided the request, the automated assistant can have a high degree of certainty that user authentication can be performed with minimal latency. However, then the user is not facing the assistant-enabled device and the automated assistant has determined that other forms of authentication may result in additional latency, relative to querying other devices for data, the automated assistant can solicit other devices for data.

Alternatively, or additionally, the automated assistant can solicit other devices for data in order to boost or demote a confidence that the automated assistant has in a particular factor of authentication. For instance, the automated assistant can perform voice authentication using audio data captured when the user is providing the assistant input (e.g., "Assistant, video call my office."). The voice authentication process can result in a confidence value X, which can be boosted and/or demoted based on each instance of data provided by each respective device. The resulting value X can then be compared to a threshold for determining whether to consider the user authenticated or not. In some implementations, when the threshold is not satisfied for a particular factor of authentication, the data solicited from the other devices can be utilized to verify another factor of authentication, without necessarily requiring the user to provide another input directly to the automated assistant. In some implementations, the device data can be utilized to authenticate a factor of authentication that is different from another factor of authentication (e.g., voice authentication) that the automated assistant may have performed. Alternatively, or additionally, solicited data can be utilized to authenticate the user without any other user input to the automated assistant being utilized to authenticate with the user.

In some implementations, the automated assistant can solicit one or more other devices via communication for an assistant-enabled device to each of the one or more other devices. The communication can embody a request for a particular device to return data that indicates a degree (e.g., a value Y) to which the particular device is confident that a particular user (e.g., a user that is estimated to be the one providing the input) is present or not. In some implementations, the data can embody a value that characterizes this degree of certainty and/or confidence that the particular user is present or not present. Alternatively, or additionally, the data can embody multiple values that characterize degrees of certainty and/or confidence that multiple different users are present and/or not present (e.g., User 1=0.2 present; User 2=0.9 present; User 3=0.7 not present). In some implementations, this value can be generated by a particular device based on whether a user of the particular device has been detected, with prior permission from the user, by the particular device, and whether this user is correlated to a particular user that the solicitation from the automated assistant is referring to. For example, the automated assistant can request data, from another device, regarding whether a particular user, having a username "JRSmith" has recently directly or indirectly engaged with the other device. The other device can correlate this username with an email (e.g., jrsmith@mail.com) address corresponding to a user of the other device. The other device can then generate data that indicates a degree to which the other device considers the user to be present or not, and/or a degree to which the other device considers one or more other users to not be present. In some implementations, a determination regarding whether a particular user is present can be at least partially based on values indicating that certain other users are not present. For instance, a home environment that can have multiple users at any given time can include devices that may predict a particular user is present at some instance, and that other users are not present in the same instance. This prediction can boost a confidence of the automated assistant regarding the particular user being present, and also boost a confidence of the automated assistant regarding another user not being present.

The method 300 can proceed from the operation 306 to an operation 308, which can include determining whether any received data authenticates the user to a particular threshold degree of confidence. In some implementations, the automated assistant can determine whether one or more values indicated by the received data, with or without weighting, satisfy a threshold for indicating the particular user is present and/or is authenticated regarding providing the input. When the received data indicates that the particular user provided the input, the method 300 can proceed from the operation 308 to an operation 310, which can include initializing performance of one or more operations to fulfill the input request. Otherwise, the method 300 can proceed from the operation 308 to an optional operation 312, which can include requesting the user to authenticate via an assistant-enabled device. In other words, because no other device indicated that a particular user was present, the automated assistant can optionally solicit the user to authenticate with the automated assistant (e.g., by entering a pin, participating in facial recognition, providing a fingerprint, etc.).

The method 300 can proceed from the optional operation 312 and/or the operation 308 to an operation 314, which can include determining whether the particular user authenticated with the automated assistant. When the user is determined to have authenticated with the automated assistant, in accordance with a method of authentication corresponding to the request, the method 300 can proceed from the operation 314 to the operation 310. Otherwise, when the user is determined to have not authenticated with the automated assistant, the method 300 can proceed from the operation 314 to an optional operation 316, which can include returning the assistant-enabled device to a standby state. Thereafter, the method 300 can return to the operation 302 for determining whether the automated assistant has received an input.

Figure 4:
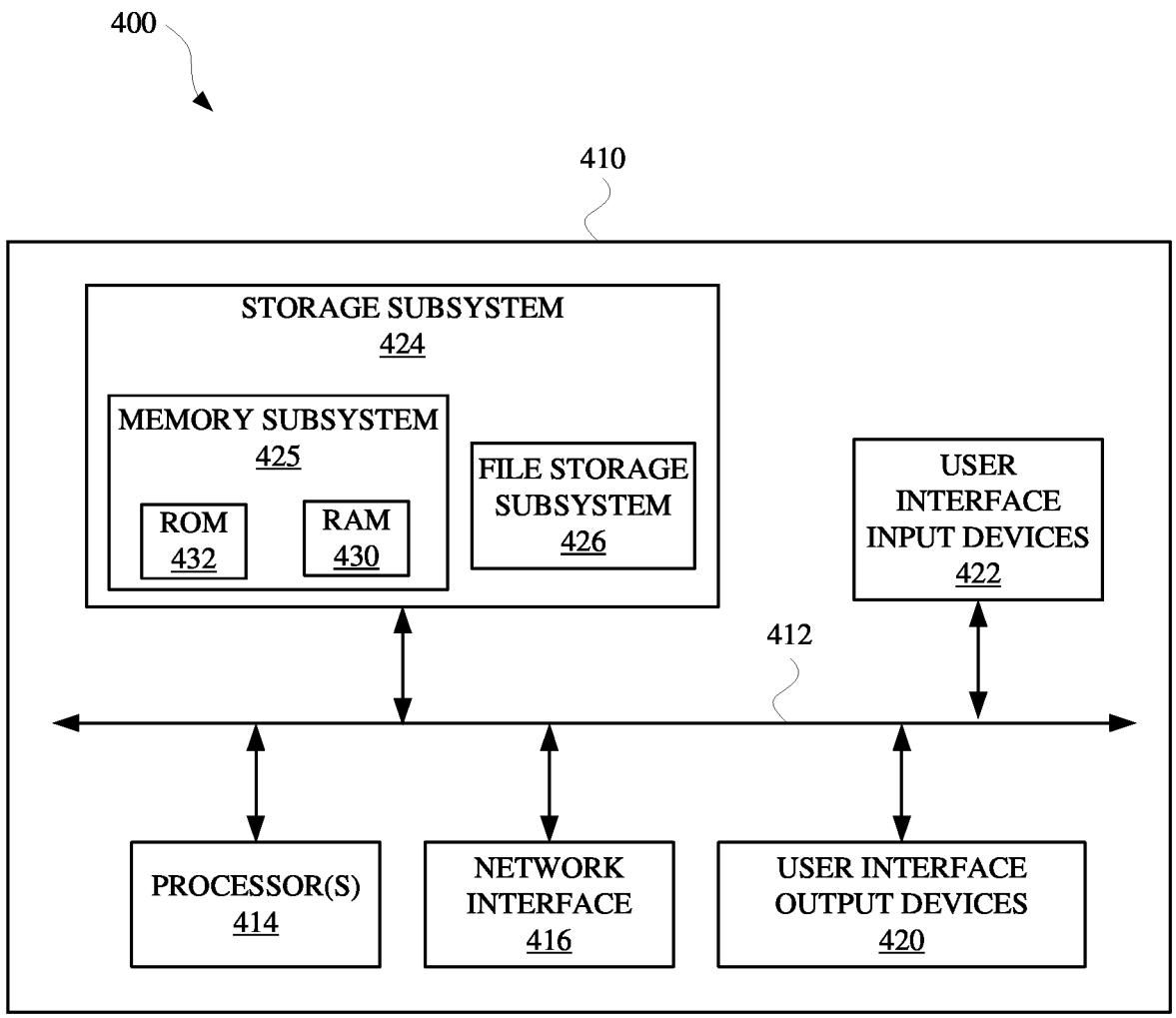
FIG. 4 is a diagram of an example computer system.

FIG. 4 is a block diagram 400 of an example computer system 410. Computer system 410 typically includes at least one processor 414 which communicates with a number of peripheral devices via bus subsystem 412. These peripheral devices may include a storage subsystem 424, including, for example, a memory 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300, and/or to implement one or more of system 200, standalone speaker device 104, automated assistant application, assistant server, and/or any other application, device, apparatus, and/or module discussed herein.

These software modules are generally executed by processor 414 alone or in combination with other processors. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as determining, at a computing device, that an automated assistant has received a request that is subject to user verification, wherein the automated assistant is accessible via the computing device, and the request is embodied in an assistant input from a user. The method can further include determining, in response to determining that the request is subject to user verification, to solicit one or more other devices for data in furtherance of verifying the user who provided the assistant input to the automated assistant, wherein the one or more other devices are separate from the computing device. The method can further include receiving, from a particular device of the other devices, device data that indicates a degree to which a particular user is predicted to have interacted with, or not interacted with, the particular device within a period of time before and/or during the computing device receiving the assistant input, wherein the device data does not include any biometric data. The method can further include determining, based at least on receiving the device data, whether the assistant input was provided by the particular user that is predicted to have interacted with, or not interacted with, the particular device. The method can further include, when the assistant input is determined to have been provided by the particular user, causing the automated assistant to perform, for the particular user, one or more operations in furtherance of fulfilling a request embodied in the assistant input.

In some implementations, the method can further include, when the assistant input is determined to not have been provided by the particular user, causing the automated assistant to indicate, in response to the assistant input, that the automated assistant will not fulfill the request embodied in the assistant input. In some implementations, the device data indicates the degree to which the particular user is predicted to have interacted with, or not interacted with, the particular device by including a presence estimation value that corresponds to an estimated probability that the particular user interacted, or did not interact, with the particular device within the period of time. In some implementations, determining whether the assistant input was provided by the particular user that is predicted to have interacted with, or not interacted with, the particular device is at least partially based on: the presence estimation value from the particular device, and an estimation of presence of the particular user generated by the automated assistant.

In some implementations, the estimation of presence generated by the automated assistant is at least partially based on processing sensor data that is captured via an interface of the computing device. In some implementations, determining whether the assistant input was provided by the particular user that is predicted to have interacted with, or not interacted with, the particular device includes: processing, using a speaker verification model, the sensor data that characterizes the assistant input to generate an utterance embedding, and comparing the utterance embedding to an existing speaker embedding for a registered user. In some implementations, determining whether the assistant input was provided by the particular user that is predicted to have interacted with, or not interacted with, the particular device includes: determining that multiple different devices of the one or more other devices have indicated various degrees to which the particular user is predicted to have interacted with, or not interacted with, the multiple different devices during the period of time, wherein the device data is received from the multiple different devices, which include the particular device.

In some implementations, the particular device does not independently provide the user with access to the automated assistant. In some implementations, the device data indicates another degree to which an additional user is predicted to have not interacted with the particular device within the period of time, and determining whether the assistant input was provided by the particular user that is predicted to have interacted with, or not interacted with, the particular device is further based on determining that the additional user did not interact with the particular device within the period of time. In some implementations, determining to solicit the one or more other devices for data in furtherance of verifying the user who provided the assistant input to the automated assistant includes: determining, by the automated assistant, a respective prediction value for each user of various users that are associated with an environment in which the computing device is located, wherein the various users include the particular user and the additional user, and determining whether the particular user provided the assistant input is further based on one or more respective prediction values.

In other implementations, a method implemented by one or more processors is set forth as including operations such as receiving, by an automated assistant, a request that is subject to user authentication via multi-factor authentication, wherein the automated assistant is accessible via a computing device, and the request is embodied in a spoken utterance from a user. The method can further include determining, in response to receiving the request, to solicit one or more other devices for data in furtherance of verifying a factor of authentication of the multi-factor authentication, wherein the one or more other devices are separate from the computing device. The method can further include receiving, from a particular device of the one or more other devices, device data that indicates a degree to which a particular user is predicted to have interacted with the particular device within a period of time before and/or during the computing device receiving the spoken utterance. The method can further include determining, based on the spoken utterance and the device data, whether to authenticate the particular user via the multi-factor authentication. The method can further include when the automated assistant determines to verify the particular user via the multi-factor authentication: causing the automated assistant to initialize performance of one or more operations in furtherance of fulfilling the request.

In some implementations, determining, based on the spoken utterance and the device data, whether to authenticate the particular user via the multi-factor authentication includes: processing, using a speaker verification model, audio data that characterizes the spoken utterance to generate an utterance embedding, and comparing the utterance embedding to an existing speaker embedding for a registered user to determine whether to authenticate the user according to an additional factor of the multi-factor authentication. In some implementations, the factor of the multi-factor authentication includes facial recognition and the additional factor of the multi-factor authentication includes voice recognition. In some implementations, the method can further include, when the automated assistant determines to not verify the user via the multi-factor authentication, causing the automated assistant to solicit the user for an additional input in furtherance of authenticating the user according to an additional factor of authentication of the multi-factor authentication.

In yet other implementations, a method implemented by one or more processors is set forth as including operations such as determining, by an automated assistant at a computing device, to solicit one or more other devices for data in furtherance of authenticating a user before the user subsequently interacts with the automated assistant, wherein the one or more other devices are separate from the computing device that provides access to the automated assistant. The method can further include receiving, from a particular device of the one or more other devices, device data that indicates a degree to which a particular user is predicted to have interacted with the particular device, wherein the device data does not include any biometric data. The method can further include determining, based at least on receiving the device data, whether to authenticate the particular user before the particular user subsequently interacts with the automated assistant. The method can further include, when the automated assistant determines to authenticate the particular user before the particular user subsequently interacts with the automated assistant, causing the automated assistant to initialize, for the particular user, caching of certain assistant data at the computing device and/or a separate computing device.

In some implementations, causing the automated assistant to initialize the caching of certain assistant data includes: causing the automated assistant to load audio data into a memory of the computing device and/or the separate computing device, wherein the audio data characterizes an audio response of the automated assistant to a predicted spoken utterance from the user. In some implementations, the method can further include, when the automated assistant determines to not authenticate the particular user before the particular user subsequently interacts with the automated assistant: causing the automated assistant to solicit the user for an additional input in furtherance of authenticating the user.

In some implementations, determining whether to authenticate the particular user before the particular user subsequently interacts with the automated assistant includes: determining that the device data indicates that the user is not present in a location that is different from a current location of the computing device. In some implementations, determining whether to authenticate the particular user before the particular user subsequently interacts with the automated assistant includes: determining a weight value for an instance of the device data from a particular device, of the one or more other devices, and processing the instance of the device data based on the weight value, wherein the weight value for the particular device is based on a historic reliability of the particular device for predicting whether the user is located in an environment with the computing device that provides access to the automated assistant. In some implementations, determining whether to authenticate the particular user before the particular user subsequently interacts with the automated assistant includes: generating an embedding based on multiple instances of device data received from multiple different devices of the one or more other devices, wherein the embedding is generated using one or more trained machine learning models that have been trained based on historical interactions between the user and the multiple different devices.

We claim:

1. A method implemented by one or more processors of a computing device, the method comprising:
    determining that an automated assistant has received a request that is subject to user verification,
        wherein the automated assistant is accessible via the computing device, and the request is embodied in an assistant input from a user;
    soliciting, in response to determining that the request is subject to user verification, one or more other devices for data in furtherance of verifying the user who provided the assistant input to the automated assistant, wherein the one or more other devices are separate from the computing device;
    receiving, in response to the soliciting and from a particular device of the other devices, non-biometric device data that indicates a degree to which a particular user is predicted to have interacted with, or not interacted with, the particular device within a period of time before and/or during the computing device receiving the assistant input,
        wherein the non-biometric device data is generated without utilizing any biometric data;
    determining, based at least on the received device data, whether the assistant input was provided by the particular user that is predicted to have interacted with, or not interacted with, the particular device; and
    when the assistant input is determined to have been provided by the particular user:
        causing the automated assistant to perform, for the particular user, one or more operations in furtherance of fulfilling a request embodied in the assistant input.

2. The method of claim 1, further comprising:
    when the assistant input is determined to not have been provided by the particular user:
        causing the automated assistant to indicate, in response to the assistant input, that the automated assistant will not fulfill the request embodied in the assistant input.

3. The method of claim 1, wherein the non-biometric device data indicates the degree to which the particular user is predicted to have interacted with, or not interacted with, the particular device by including a presence estimation value that corresponds to an estimated probability that the particular user interacted, or did not interact, with the particular device within the period of time.

4. The method of claim 1, wherein determining whether the assistant input was provided by the particular user that is predicted to have interacted with, or not interacted with, the particular device is at least partially based on:
    the presence estimation value from the particular device, and
    an estimation of presence of the particular user generated by the automated assistant.

5. The method of claim 4, wherein the estimation of presence generated by the automated assistant is at least partially based on processing sensor data that is captured via an interface of the computing device.

6. The method of claim 5, wherein determining whether the assistant input was provided by the particular user that is predicted to have interacted with, or not interacted with, the particular device includes:
    processing, using a speaker verification model, the sensor data that characterizes the assistant input to generate an utterance embedding, and
    comparing the utterance embedding to an existing speaker embedding for a registered user.

7. The method of claim 4, wherein determining whether the assistant input was provided by the particular user that is predicted to have interacted with, or not interacted with, the particular device includes:
    determining that multiple different devices of the one or more other devices have indicated various degrees to which the particular user is predicted to have interacted with, or not interacted with, the multiple different devices during the period of time,
        wherein the non-biometric device data is received from the multiple different devices, which include the particular device.

8. The method of claim 1, wherein the particular device does not independently provide the user with access to the automated assistant.

9. The method of claim 1,
    wherein the non-biometric device data indicates another degree to which an additional user is predicted to have not interacted with the particular device within the period of time, and
    wherein determining whether the assistant input was provided by the particular user that is predicted to have interacted with, or not interacted with, the particular device is further based on determining that the additional user did not interact with the particular device within the period of time.

10. The method of claim 9, wherein at least some of the non-biometric device data includes:
    a respective prediction value for each user of various users that are associated with an environment in which the computing device is located,
        wherein the various users include the particular user and the additional user, and determining whether the particular user provided the assistant input is further based on one or more of the respective prediction values.

11. A method implemented by one or more processors of a computing device, the method comprising:
    receiving, by an automated assistant, a request that is subject to user authentication via multi-factor authentication,
        wherein the automated assistant is accessible via the computing device, and the request is embodied in a spoken utterance from a user;
    soliciting, in response to receiving the request, one or more other devices for data in furtherance of verifying a factor of authentication of the multi-factor authentication,
        wherein the one or more other devices are separate from the computing device;

receiving, in response to the soliciting and from a particular device of the one or more other devices, non-biometric device data that indicates a degree to which a particular user is predicted to have interacted with the particular device within a period of time before and/or during the computing device receiving the spoken utterance;
   wherein the non-biometric device data is generated without utilizing any biometric data;
determining, based on the spoken utterance and the received non-biometric device data, whether to authenticate the particular user via the multi-factor authentication; and
when the automated assistant determines to verify the particular user via the multi-factor authentication:
   causing the automated assistant to initialize performance of one or more operations in furtherance of fulfilling the request.

12. The method of claim 11, wherein determining, based on the spoken utterance and the non-biometric device data, whether to authenticate the particular user via the multi-factor authentication includes:
   processing, using a speaker verification model, audio data that characterizes the spoken utterance to generate an utterance embedding, and
   comparing the utterance embedding to an existing speaker embedding for a registered user to determine whether to authenticate the user according to an additional factor of the multi-factor authentication.

13. The method of claim 12, wherein the factor of the multi-factor authentication includes facial recognition and the additional factor of the multi-factor authentication includes voice recognition.

14. The method of claim 11, further comprising:
when the automated assistant determines to not verify the user via the multi-factor authentication:
   causing the automated assistant to solicit the user for an additional input in furtherance of authenticating the user according to an additional factor of authentication of the multi-factor authentication.

15. A method implemented by one or more processors, the method comprising:
determining, by an automated assistant at a computing device, to solicit one or more other devices for data in furtherance of authenticating a user before the user subsequently interacts with the automated assistant,
   wherein the one or more other devices are separate from the computing device that provides access to the automated assistant;
receiving, from a particular device of the one or more other devices, non-biometric device data that indicates a degree to which a particular user is predicted to have interacted with the particular device,
   wherein the non-biometric device data is generated without utilizing any biometric data;
determining, based at least on receiving the non-biometric device data, whether to authenticate the particular user before the particular user subsequently interacts with the automated assistant; and
when the automated assistant determines to authenticate the particular user before the particular user subsequently interacts with the automated assistant:
   causing the automated assistant to initialize, for the particular user, caching of certain assistant data at the computing device and/or a separate computing device in furtherance of fulfilling a request that the user is predicted to provide.

16. The method of claim 15, wherein causing the automated assistant to initialize the caching of certain assistant data includes:
   causing the automated assistant to load audio data into a memory of the computing device and/or the separate computing device,
      wherein the audio data characterizes an audio response of the automated assistant to a predicted spoken utterance from the user.

17. The method of claim 15, further comprising:
when the automated assistant determines to not authenticate the particular user before the particular user subsequently interacts with the automated assistant:
   causing the automated assistant to solicit the user for an additional input in furtherance of authenticating the user.

18. The method of claim 15, wherein determining whether to authenticate the particular user before the particular user subsequently interacts with the automated assistant includes:
   determining that the non-biometric device data indicates that the user is not present in a location that is different from a current location of the computing device.

19. The method of claim 15, wherein determining whether to authenticate the particular user before the particular user subsequently interacts with the automated assistant includes:
   determining a weight value for an instance of the non-biometric device data from the particular device, of the one or more other devices, and
   processing the instance of the non-biometric device data based on the weight value,
      wherein the weight value for the particular device is based on a historic reliability of the particular device for predicting whether the user is located in an environment with the computing device that provides access to the automated assistant.

20. The method of claim 15, wherein determining whether to authenticate the particular user before the particular user subsequently interacts with the automated assistant includes:
   generating an embedding based on multiple instances of non-biometric device data received from multiple different devices of the one or more other devices,
      wherein the embedding is generated using one or more trained machine learning models that have been trained based on historical interactions between the user and the multiple different devices.

* * * * *